Sept. 24, 1929.    S. B. SCHENCK    1,729,456
CONTROL SYSTEM
Filed Feb. 19, 1927

WITNESSES:
E. A. M?Claskey
E. W. Savage

INVENTOR
Samuel B. Schenck
BY
Wesley G. Carr
ATTORNEY

Patented Sept. 24, 1929

1,729,456

UNITED STATES PATENT OFFICE

SAMUEL B. SCHENCK, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed February 19, 1927. Serial No. 169,514.

This invention relates to control systems for gas-electric power units and, more particularly, to control systems that are suitable for the control of gas-electric power units adapted for propelling vehicles.

The object of the invention, generally stated, is the provision of a control system that shall be simple and efficient in operation, and readily and economically manufactured.

A more specific object of the invention is to provide for the selection of the circuits to be established by the actuation of a manually-operated switch.

Another object of the invention is to provide control means adapted to prevent the changing of the motor connections when there is a small resistance in the motor circuits.

Other objects of the invention will, in part, be obvious, and will, in part, appear hereinafter.

The invention, accordingly, is disclosed in the embodiment thereof shown in the accompanying drawing, and comprises the structural features, the combination of elements and arrangement of parts that will be exemplified in the structure hereinafter set forth, and the scope of the application of which will be indicated in the claims.

For fuller understanding of the nature and objects of the invention, reference should be had to the following detailed description taken in conjunction with the accompanying drawing in which.

Figure 1:
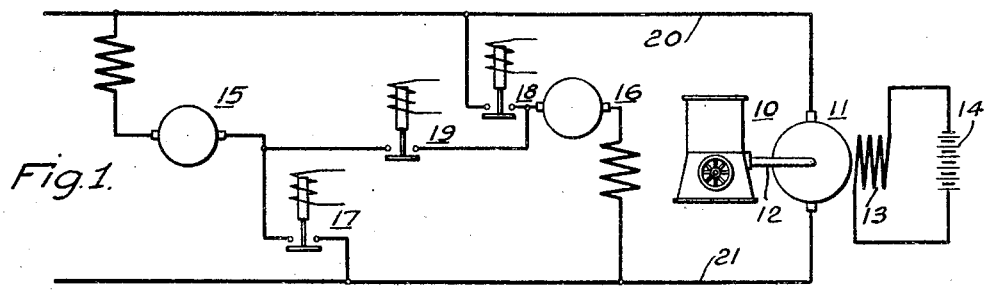
Figure 1 shows diagrammatically, a power unit.

Referring now to the drawing, 10 designates a gas engine of any type suitable as the prime mover of a gas-electric power unit that may be utilized for propelling vehicles. It will be observed that the gas engine 10 is connected directly to the generator 11 through a shaft 12. The field winding 13 of the generator may be energized from any source of electrical energy and, in this particular case, a storage battery 14 is provided.

In this embodiment of the invention, in the interest of simplicity in the drawing, only two propelling motors 15 and 16 are shown. However, it will be readily understood that any desired number of motors required to meet the operating conditions may be provided. It will further be noted that the motors 15 and 16 are of the series type and are disposed to be connected directly across the armature of the generator 11, either in parallel or series relation, by means of the switches 17 to 19, inclusive.

In order to connect the motors 15 and 16 in series relation, the switch 19 is closed, and current flows from the generator 11, through conductor 20, motor 15, switch 19, motor 16, and conductor 21, to the generator. If the series switch 19 is opened and the switches 17 and 18 are closed, the motors are connected in parallel relation and current may flow from the generator 11, through conductor 20, switch 18, motor 16 and conductor 21, to the generator and also from the conductor 20, through motor 15 and switch 17 to the negatively energized conductor 21.

It will be readily understood that resistors, including a plurality of units, may be connected in the motor circuits to control the acceleration of the motors. However, since such practice is well known in the art, it is not considered necessary to illustrate or describe the resistors that may be provided for accelerating the motors.

In this particular control system, a contact segment for cutting the resistors out of the motor circuits step-by-step may be provided, for operation in conjunction with the sequence drum shown generally at 22.

In order to provide for the reversal of the direction of rotation of the motors 15 and 16, a reverser switch 23 is provided for controlling the setting of the reverser drum 24. The reverser drum 24 may be utilized for reversing the field-winding connections of the motors in any well-known manner, and, therefore, the connections for carrying out this operation are not shown.

It will also be observed that a master controller 25 of any suitable type is provided, whereby the operator may control the operation of the air engine 26 and, therefore, the sequence drum 22, thereby to govern the acceleration of the motors.

In order to provide for the selection of the motor circuits to be established, a relay, shown generally at 27, is utilized. As will be observed, the actuating coil of the relay 27 is disposed to be connected across a storage battery 28 when the master controller 25 is set in its first position.

In control systems, it is desirable that provision be made to permit the operator to select the motor connections to be utilized for operating the vehicle under different operating conditions. Accordingly, in this system, a manually operable switch 30 is provided for controlling the actuating circuit of the relay 27.

Assuming that it is desired to operate the motors 15 and 16 in the forward direction and to connect them in series relation, the switch 30 is set for series operation; which, in this instance, means that it is closed. Further, the reverser switch 23 is actuated to its forward position and the controller 25 is advanced to position a.

Figure 2:
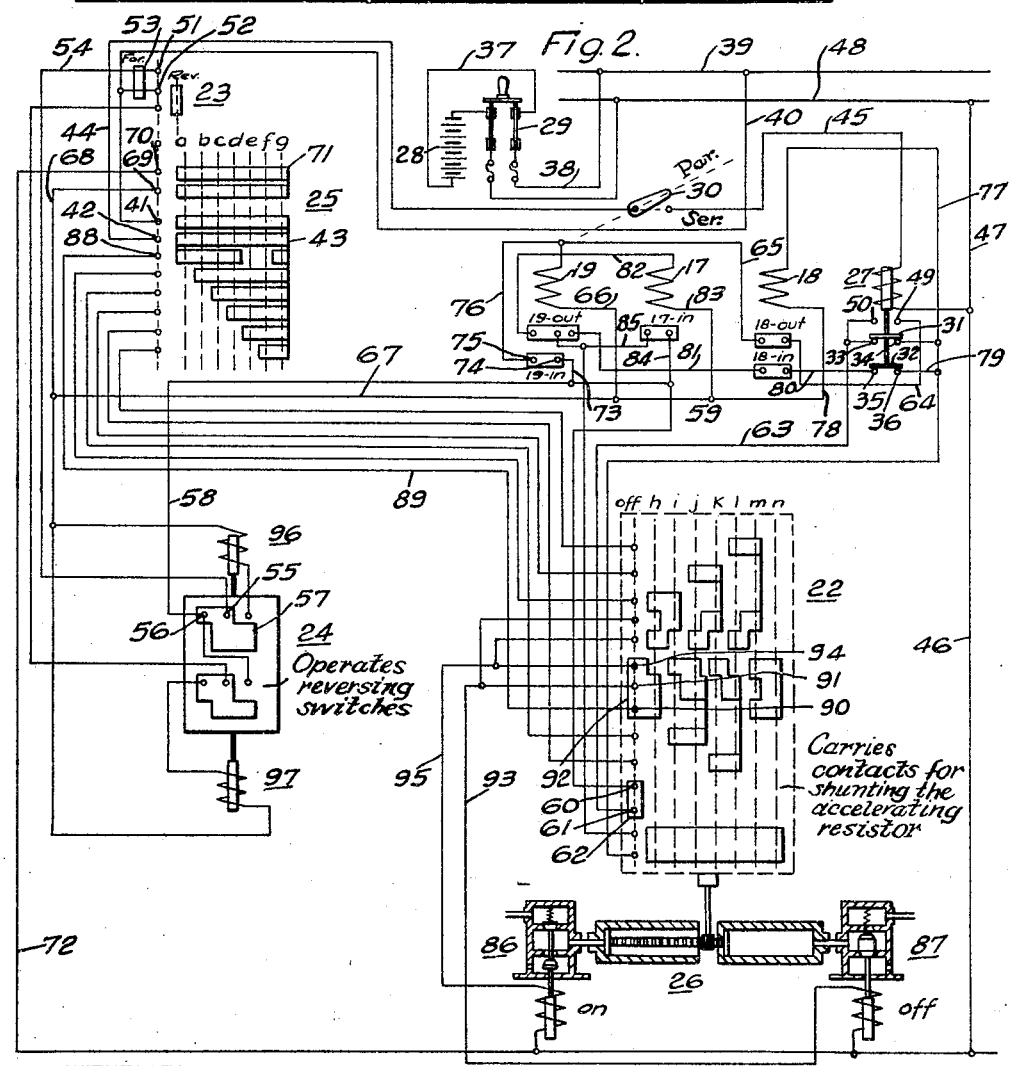
Fig. 2 illustrates diagrammatically a control system constructed in accordance with this invention.

As will be observed, by reference to Fig. 2, that when the switch 30 is actuated to its closed position, a circuit is established which extends from the battery 28, through conductor 37, switch 29, conductors 38, 39 and 40, contact fingers 41 and 42, bridged by the contact segment 43, conductor 44, switch 30, conductor 45, the actuating coil of the relay 27, and conductors 47 and 48, to the battery 28. Accordingly, the relay 27 is energized and the contact plate 31 is actuated to bridge the contact fingers 49 and 50. Therefore, by closing the switch 30, circuit connections are established which may be utilized to actuate the relay 27 to make predetermined motor connections, which will be referred to hereinafter.

Upon the actuation of relay 27, a switch-actuating circuit is established which extends from the energized conductor 39, which is connected to the battery 28, conductor 40, contact fingers 51 and 52, bridged by the contact plate 53 of the reverser switch 23, conductor 54, contact fingers 55 and 56, bridged by the contact segment 57 of the reverser drum 24, conductors 58 and 59, contact fingers 60 and 61, bridged by the contact plate 62 of the sequence drum 22, when the latter is in its off position, conductor 63, contact fingers 50 and 49, bridged by the contact plate 31 of the relay 27, conductor 64, interlock 18-out, conductor 65, the actuating coil of the series switch 19, conductors 66, 67 and 68, the contact fingers 69 and 70, bridged by the contact segment 71 of the master controller 25, to the negative conductor 72. Upon the closure of the series switch 19, the series motor circuit, which has been already traced, is established.

In order to retain the switch 19 closed when the sequence drum 22 moves from its off position, a holding circuit is provided. As will be observed, the holding circuit extends from the energized conductor 58, through conductor 73, contact fingers 74 and 75, bridged by the interlock 19-in, carried by the switch 19, conductor 76, the actuating coil of the switch 19, conductor 66 to the conductor 67 which is connected to the negative conductor 72. Therefore, the series motor circuit is maintained as the sequence drum 22 moves forward step by step to effect the acceleration of the motors.

Assuming that it is desired to operate the motors 15 and 16 connected in parallel, the master controller is first thrown to its off position to return the sequence drum 22 to its off position. As will be noted, the throwing of the master controller 25 to its off position interrupts the actuating circuit of the switch 19 by the breaking of the electrical connection between the contact fingers 69 and 70.

In order to deenergize the relay 27, the switch 30 is opened or the master controller thrown to its "off" position, thereby interrupting its actuating circuit. Upon the deenergization of the relay 27, the plates 31 and 32 are permitted to drop to their lower positions, where they contact with the pairs of contact fingers 33, 34 and 35, 36 respectively.

Assuming that the reverser switch is left in its forward position and that the master controller 25 is advanced to its first operating position a, the actuating circuits of the parallel switches 17 and 18 are the same as the circuit described for the switch 19, until the conductor 63 is reached, from whence the current flows, through contact fingers 33 and 34, bridged by the contact plate 31, conductor 77, the actuating coil of switch 18 and conductor 78, to the conductor 67 which is connected to the negative conductor 72. The switch 18 is closed and, through the operation of the interlock 18-in, carried by the switch 18, the actuating circuit for the switch 17 is closed. As will be observed, current now flows from the energized conductor 77, through conductor 79, contact fingers 36 and 35, bridged by the contact plate 32, conductor 80, the interlock 18-in, conductor 81, interlock 19-out, carried by the series switch 19, conductor 82, the actuating coil of the switch 17 and conductor 83, to the negative conductor 67. Therefore, the switch 17 is closed immediately after the switch 18 is closed.

A holding circuit for the switch 17 is established which may be traced from the energized conductor 58, through conductor 84, interlock 17-in, carried by the switch 17, conductor 85, the interlock 19-out, conductor 82, the actuating coil of the switch 17 and conductor 83, to the negative conductor 67.

Therefore, the switches 17 and 18 are closed to connect the motors 15 and 16 in parallel and to establish the parallel motor circuits hereinbefore traced.

The air engine 26 may be of a well-known type which functions to rotate the sequence drum in one direction when both of the valves 86 and 87 are energized, and in the opposite direction when both of the valves are deenergized. Further, when one valve is energized and the other deenergized, the air engine may be stopped in any desired position.

It will be readily understood that the operator cannot change from parallel connections of the motor to series connections until the sequence drum has been returned to its off position, since he cannot complete the establishment of the actuating circuit for the switch 19 by the closure of the switch 30. In order to establish a series motor circuit, it is necessary first to effect the actuation of the relay 27 which requires a return of the sequence drum 22 to its off position, where the contact segment 62 bridges the contact fingers 60 and 61. Thus, it will be understood that it is impossible to change from series to parallel motor connections or from parallel to series motor connections without first returning the master controller 25 to its off position, causing the sequence drum to return to its off position, thereby to introduce the desired protective resistance into the motor circuits.

It is thought that it will be sufficient to describe one step in the operation of the sequence drum. When the master controller is thrown to position a, current flows from the contact segments, through contact finger 88, conductor 89, contact fingers 90 and 91, bridged by the contact segment 92 of the sequence drum 22, conductor 93 and the actuating coil of the valve 87, to the negative conductor 72. It will also be noted that the contact finger 94 is connected to the contact finger 90 through the contact segments 92, and current flows, through conductor 95 and the actuating coil of the valve 86, to the negative conductor 72. Therefore, the valves 86 and 87 are energized, admitting air through the valve 86 and exhausting it through the valve 87 to effect the operation of the sequence drum 22 in a forward direction. The operation of the sequence drum will continue step-by-step as the master controller 25 is advanced step-by-step.

The reverser drum 24 may be set in any position to control the direction of rotation of the motors by energizing the operating magnet 96 or the magnet 97 through the manipulation of the reverser switch 23.

Since certain changes may be made in the above construction and different embodiments of the invention may be made without departing from the spirit thereof, it is intended that all matter contained in the above description or shown in the accompanying drawing shall be interpreted as illustrative and not in a limiting sense.

I claim as my invention:

1. In a control system for gas-electric power units provided with a plurality of motors, in combination, a master controller, means adapted to be actuated by the master controller for connecting the motors in series relation, means disposed to be operated by the master controller for connecting the motors in parallel relation, means for selecting the motor connections to be established upon the actuation of the master controller, and means carried by the controller disposed to co-operate in the selection of the motor connections when the controller is in its off position, thereby to prevent the change of the motor connections before the controller has been actuated from its off position.

2. In a control system for gas-electric power units provided with a plurality of motors, in combination, a master controller, means adapted to be actuated by the master controller for connecting the motors in series relation, means disposed to be operated by the master controller for connecting the motors in parallel relation, a relay for selecting the desired motor connections, means for effecting the actuation of the relay when the controller is advanced from its off position, said relay being disposed to open the established motor circuits when actuated after the controller has been advanced from its off position.

3. In a control system for gas-electric power units, in combination, a plurality of motors, switches for connecting the motors in series and parallel circuit relation for continuous operation, control means for effecting the operation of the switches, means for selecting the switches to be actuated by the operation of the control means, thereby to connect the motors in the desired circuit relation, and interlocking means for preventing the changing of the circuit connections of the motors without returning the control means to its off position.

4. In a control system for gas-electric power units, provided with a plurality of motors, in combination, a master controller, means disposed to be operated in response to the actuation of the master controller for connecting the motors in series and in parallel-circuit relation, and means for selecting the motor circuits to be established, said selective means being disposed to cooperate with the master controller to establish predetermined motor-circuit relations only when the controller is in its "off" position.

5. A control system for gas-electric power units provided with a plurality of motors, in combination, a master controller, means disposed to be operated in response to the actuation of the master controller for connecting the motors in series and in parallel-circuit relation, means for selecting the motor circuits to be established and means for rendering the selecting means inoperative when the controller stands in any position other than the "off" position to cause the return of the controller to its "off" position before new circuit conditions are established.

6. In a control system for gas-electric power units provided with a plurality of motors, in combination, a master controller, means responsive to the operation of the master controller for connecting the motors in series and in parallel-circuit relation, a relay for controlling the motor-circuit relations established, manually operable means for controlling the operation of the relay and means for maintaining established motor-circuit connections, irrespective of the operation of said manual means, until the controller is returned to its off position.

In testimony whereof, I have hereunto subscribed my name this 16th day of February, 1927.

SAMUEL B. SCHENCK.